UNITED STATES PATENT OFFICE.

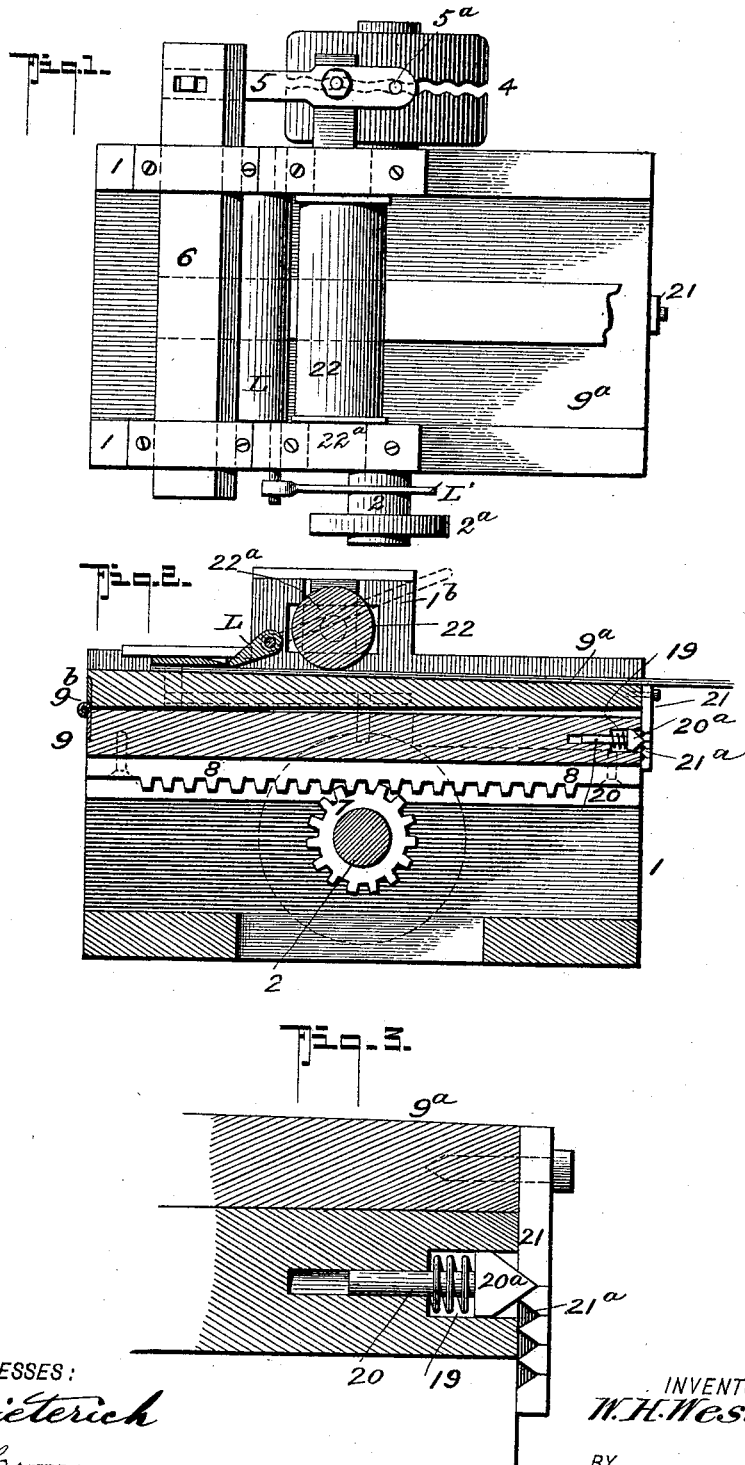

WILLIAM H. WESTON, OF YARMOUTHVILLE, MAINE.

MACHINE FOR SKIVING LEATHER.

SPECIFICATION forming part of Letters Patent No. 615,935, dated December 13, 1898.

Application filed September 9, 1897. Serial No. 651,078. (No model.)

*To all whom it may concern:*

Be it known that I, WILLIAM H. WESTON, residing at Yarmouthville, in the county of Cumberland and State of Maine, have invented a new and Improved Machine for Skiving Leather, of which the following is a specification.

This invention relates to improvements on scarfing-machines for making the beveled portion or lap upon either end of leather or other belting; and it refers more particularly to improvements on a machine of this character disclosed in Patent No. 242,087, dated May 24, 1881.

In the use of the machine above referred to the bevel or lap is cut upon opposite sides of the leather, that the beveled portions, when placed together and secured, will present a portion where the lap occurs approximately the same width and thickness as the body, such result being effected by a single operation on each end to save stock and insure a perfect lap, a positive length, and even thickness. This result in the use of such machine is obtained by arranging the cutting mechanism to engage the belt at the extreme end and cutting inward in contradistinction to the former methods of beginning at the inner end of the bevel or lap and by successive operations trim the end by cutting down toward the end.

In the patented machine referred to no means for positively setting the upper table to make laps of definite length is provided—that is, say the operator wishes laps of one inch, three inches, or other lengths he cannot adjust the upper table without setting it by successive trials until such upper table has such relation to the bottom table or bed that the cutter will effect a one-inch, two-inch, or other definite length of lap-cut.

The object of this invention is to provide a suitable adjusting means adapted to coöperate with the movable and fixed table members at an appropriate point in such a manner that the operator by manipulating the same can almost instantly and without trial cutting set the table relatively to the cutter to adapt the parts to produce a one-inch, two-inch, or other definite length of lap-cut.

To these ends the invention consists in such novel features of construction and peculiar combination of parts as will be first described in detail, and then be specifically pointed out in the appended claims, reference being had to the accompanying drawings, in which—

Figure 1 is a top plan of a scarfing or lapping machine with my improvement applied. Fig. 2 is a central longitudinal section of the same, and Fig. 3 is an enlarged sectional view of the end of the table having my improved adjusting devices.

To clearly set out the operation of the complete machine, I shall describe in detail the construction of the cutting, belt-carrier, and presser devices, it being, however, understood that *per se* they form no part of this invention.

In the accompanying drawings, in which like numerals indicate like parts in all the figures, 1 indicates the main frame, which has suitable journal-bearings for the shaft 2, having a power-pulley $2^a$ at one end and a cam-wheel 4 fixedly held on the other end. This cam-wheel has a sinuous or other camway, which engages the pin $5^a$ of an oscillating lever 5, fulcrumed on a suitable bracket, the outer end of which is loosely connected to the reciprocating knife or saw 6, working in proper guides on the frame 1 transversely thereof, as shown.

The shaft 2 carries a gear-wheel 7, which engages the rack-bar 8 on the under side of the table, held to travel at right angles to the movement of the saw or knife 6. This table consists of a bottom or body member 9, having no vertical movement, and an upper portion $9^a$, hinged at $9^b$ to the body 9, its upper face being inclined from its hinged end downward, while its front end is loosely held on the body 9, whereby it is capable of elevation to render it adjustable relatively to the saw or knife 6.

As a convenient means for positively adjusting the table $9^a$ at one operation and to set it so as to produce the desired cutting operation, I provide a bottom table-section with a socket 19 in its outer end, in which is held to slide the double-beveled head $20^a$ of a spring-actuated locking-dog 20, which is adapted to engage with any one of a series of beveled notches $21^a$ of the pendent plate 21, fixedly secured to the upper table $9^a$. By providing the table with adjusting means of the character stated it is obvious that lift or pressure on the top table will serve to force the dog 20 automatically inward to allow for the proper rise or fall of the plate 21 to the desired point, the said dog automatically engaging such plate 21 to lock it to its set position.

22 indicates a feed-roll journaled in blocks 22$^a$, operating loosely in spring-pressed bearings in the standards 1$^b$ of the frame.

L indicates the presser-bar, having a hand-lever L'.

The complete operation of my machine is as follows: The inclined table is receded until the knife is in an approximately close contact with the same. The material is then forced under the roll 22 and the presser-bar applied to hold the material close down on the table 9$^a$. The drive-shaft being then rotated, the knife or saw cuts the material exactly according to the angle of the table, which angle is instantly attained by a proper manipulation of the adjusting devices.

By providing adjusting means which can be instantly manipulated to set the table 9$^a$ at the proper inclination to produce the cut required the advantages of the machine disclosed in the patent referred to are greatly enhanced, as the time heretofore required to set the table by repeated trials is saved, thereby effecting not only a great saving of labor, but also increasing the capacity of the machine. Furthermore, a more positive and accurate operation of cutting the lap at each end of exactly the same desired length of lap is effected by my improvements than can be obtained by the repeated trials or successive adjustments of the table 9$^a$.

Having thus described my invention, what I claim, and desire to secure by Letters Patent, is—

1. In a machine for the purposes described, the combination with the bottom table-section and the upper hinged section, of a spring-actuated detent and a toothed scale-plate, secured to such table-sections, substantially in the manner shown, whereby to automatically lock the hinged table-section to its adjusted position as it is raised or lowered, as specified.

2. In a machine as described, the combination with cutting mechanism of a traveling table hinged at one end, and a locking device connected with the table to hold the same at the desired adjustment and capable of automatically engaging and releasing the table when the same is raised and lowered, said locking device having a gage to indicate the degree of adjustment, substantially as described.

WILLIAM H. WESTON.

Witnesses:
HENRY M. MALING,
ALBERT S. WOODMAN.